United States Patent
Shor et al.

(10) Patent No.: US 10,225,196 B2
(45) Date of Patent: Mar. 5, 2019

(54) APPARATUS, SYSTEM AND METHOD FOR CONTROLLING PACKET DATA FLOW

(71) Applicants: Roy Shor, Tel-Aviv (IL); Ori Goren, Kibutz Ruchama (IL); Avraham Horn, Givat Shmuel (IL); John Vaglica, Austin, TX (US); Tuongvu Nguyen, Austin, TX (US)

(72) Inventors: Roy Shor, Tel-Aviv (IL); Ori Goren, Kibutz Ruchama (IL); Avraham Horn, Givat Shmuel (IL); John Vaglica, Austin, TX (US); Tuongvu Nguyen, Austin, TX (US)

(73) Assignee: NXP USA, Inc., Austin, TX (US)

( * ) Notice: Subject to any disclaimer, the term of this patent is extended or adjusted under 35 U.S.C. 154(b) by 218 days.

(21) Appl. No.: 14/765,841

(22) PCT Filed: Feb. 15, 2013

(86) PCT No.: PCT/IB2013/051256
§ 371 (c)(1),
(2) Date: Aug. 5, 2015

(87) PCT Pub. No.: WO2014/125337
PCT Pub. Date: Aug. 21, 2014

(65) Prior Publication Data
US 2015/0372930 A1    Dec. 24, 2015

(51) Int. Cl.
*H04L 12/833*    (2013.01)
*H04L 29/08*    (2006.01)
*H04W 72/04*    (2009.01)

(52) U.S. Cl.
CPC ........ *H04L 47/2458* (2013.01); *H04L 69/324* (2013.01); *H04W 72/04* (2013.01)

(58) Field of Classification Search
CPC .......... G06F 11/00; G06F 13/40; H04L 12/42; H04L 12/44; H04L 12/56; H04L 12/833;
(Continued)

(56) References Cited

U.S. PATENT DOCUMENTS 5,793,981 A  * 8/1998 Billings .................. H04L 12/44
                                                                370/365
7,031,341 B2    4/2006 Yu
(Continued)

FOREIGN PATENT DOCUMENTS

KR    1020030008425    1/2003

OTHER PUBLICATIONS

International Search Report and Written Opinion correlating to PCT/IB2013/051256 dated Nov. 13, 2013.
(Continued)

*Primary Examiner* — Zhiren Qin
*Assistant Examiner* — Harry H Kim

(57) ABSTRACT

A system for use in nodes communicating over a CPRI (common public radio interface) allows each networking node in a daisychain configuration to seamlessly manage the control and management HDLC (high-speed data link control) channel for both uplink and downlink. The connection is kept alive through a soft reset flow. Received HDLC packets can be extracted for use by a local node. Locally generated packets can be inserted into the packet data stream at the datalink layer for onward transmission over the CPRI. The system arbitrates between the locally generated packet data held in a buffer in the local node and remote packet data received from a remote node and held in the local node in a first in first out buffer for onward transmission to a subsequent node after arbitration. Remote packet data is given priority.

17 Claims, 5 Drawing Sheets

(58) Field of Classification Search
CPC ..... H04L 29/08; H04L 45/00; H04L 47/2458; H04L 69/324; H04W 72/04; H04J 3/065
See application file for complete search history.

(56) References Cited

U.S. PATENT DOCUMENTS

| | | |
|---|---|---|
| 7,072,347 B2 | 7/2006 | Calvignac et al. |
| 7,161,946 B1 | 1/2007 | Jha |
| 7,567,587 B1 | 7/2009 | Mlazgar et al. |
| 7,676,602 B2 | 3/2010 | Uzun et al. |
| 2002/0136163 A1 | 9/2002 | Kawakami et al. |
| 2005/0246349 A1 | 11/2005 | Wielgosz et al. |
| 2008/0089689 A1 | 4/2008 | Sakama |
| 2009/0245100 A1* | 10/2009 | Suzuki .............. H04L 12/40006 370/225 |
| 2009/0279485 A1 | 11/2009 | Julka et al. |
| 2009/0310610 A1* | 12/2009 | Sandstrom .............. H04L 45/00 370/392 |
| 2014/0094157 A1 | 4/2014 | Nguyen et al. |
| 2015/0207714 A1* | 7/2015 | Ruffini .................... H04J 3/065 370/350 |
| 2015/0372930 A1* | 12/2015 | Shor .................. H04L 47/2458 370/329 |

OTHER PUBLICATIONS

Common Public Radio Interface Specification Version 5.0 (Sep. 21, 2011).
Freescale Semiconductor data sheet MSC8157E Nov. 2011.

\* cited by examiner

APPARATUS, SYSTEM AND METHOD FOR CONTROLLING PACKET DATA FLOW

FIELD OF THE INVENTION

This invention relates to an apparatus, a system and a method for controlling packet data flow through a transmission node and particularly, though not exclusively for handling flow of packet data in cellular communications networks.

BACKGROUND OF THE INVENTION

In a typical cellular communications system, wireless user equipment units (UEs), for example, mobile phones, communicate via a radio access network to one or more core networks. A radio access network covers a geographical area which is divided into cells, with each cell area being served by a radio base station. Several base stations are connected, typically via land lines, to a control node known as a radio network controller (RNC). Such a control node supervises and coordinates various activities of the several radio base stations which are connected to it. The radio network controllers are typically connected to one or more core networks. One example of a radio access network is the Universal Mobile Telecommunications (UMTS) Terrestrial Radio Access Network (UTRAN). The UMTS is a third generation (3G) system and UTRAN is essentially a radio access network providing wideband code division multiple access (WCDMA) to user equipment units. Fourth generation systems are evolving towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network.

In many radio access networks the radio base station is a concentrated node with most of its components being located at a concentrated site. However, a radio base station can also be configured with a more distributed architecture. For example, a distributed radio base station can take the form of one or more radio equipment (RE) portions that are linked to one or more radio equipment control (REC) portions over an internal interface. One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 5.0 (2011).

The Common Public Radio Interface (CPRI) is an industry cooperation aimed at defining a publicly available specification for the key internal interface of radio base stations between radio equipment control (REC) and radio equipment (RE), thereby allowing base station manufacturers to share a common protocol and more easily adapt platforms from one customer to another. In essence, a radio base station is decomposed into two separate blocks, known as REC and RE. The REC provides access to a UMTS network, for example, via the Iub interface, whereas the RE serves as the air interface to user equipment, known as Uu in a UMTS network. The REC generally comprises the radio functions of the digital baseband domain, whereas the RE contains analogue radio frequency functions.

The CPRI interface supports several types of information flow, notably user plane information in the form of in-phase and quadrature (IQ) modulation data (the digital baseband signals) and control and management (C & M) information which is exchanged between the control and management entities within a REC and a RE. The CPRI has a basic frame structure for carrying a control word and an IQ data block. The IQ data of different antenna carriers are multiplexed by a time division multiplexing scheme onto an electrical or optical transmission line. The control and management data are either sent as inband protocol or by layer 3 protocols that reside on top of appropriate layer 2 protocols. C&M data are time-multiplexed with synchronisation data and the IQ data over the CPRI. Two different layer 2 protocols for C&M data are supported by CPRI. These are Ethernet and High-Level Datalink Control (HDLC). A vendor-specific channel may also be supported.

HDLC is a protocol developed by the International Organisation for Standardisation and falls under ISO standards ISO 3309 and ISO 4335 HDLC is sometimes referred to as the slow C&M channel in CPRI (Ethernet being referred to as the fast channel) HDLC can support several data rates and operates to provide a reliable communications path between nodes with acknowledged data transfer. Each piece of data is encapsulated in an HDLC frame with a trailer and a header (address and control field). The trailer has a cyclic redundancy check (CRC) and the frames are separated by a flag sequence.

The functional split between the REC and RE allows the RE to be positioned close to an associated antenna. This reduces the distance which the associated signals have to travel before they are received by the RE, thereby negating the need for tower-mounted amplifiers and antenna system controllers. The link between the RE and REC is generally optical, allowing the link length to be much greater when compared with wired coaxial systems. Therefore, the distance between the RE and REC can be up to 40 Km, thereby increasing the flexibility of deployment of RE-s within the network when utilising CPRI. One REC may be linked to two or more RE-s or one RE may be linked to multiple REC-s in a chain topology with each REC being configured to forward data to other REC-s in the chain. The CPRI daisy chain configuration consists of multiple REC-s and multiple RE-s. The REC chain comprises the baseband units and the RE chain comprises the remote radio head units.

Many of the functions which an REC has to perform, which include channel coding/encoding, spreading/despreading, frame and time slot generation, for example, may be realised by a proprietary digital signal processing device. Two examples of such DSP devices which support the CPRI are the Freescale B4860 and the Freescale MSC 8157 Broadband Wireless, Access Six Core DSP which is described in Freescale Semiconductor Data Sheet MSC8157E, November 2011. This Digital Signal Processor includes (inter alia) a CPRI unit Each CPRI unit may support two CPRI lanes, each lane typically comprising a framer module and a direct memory access (DMA) module for transferring receive and transmit data to and from a system memory.

The CPRI protocol defines an HDLC stream in a way such that only the REC which has full knowledge of the topology is permitted to manage the stream (that is the end-point REC). A similar situation applies to the RE chain where only the end-point RE may handle the stream. This has the drawback of (despite all components in the chain being able to read the HDLC packets) only the endpoint REC or endpoint RE being able to write. This restriction does not allow the networking REC-s or RE-s to report on their status or to deliver control messages.

SUMMARY OF THE INVENTION

The present invention provides an apparatus, system and method for controlling packet data flow through a transmission node as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
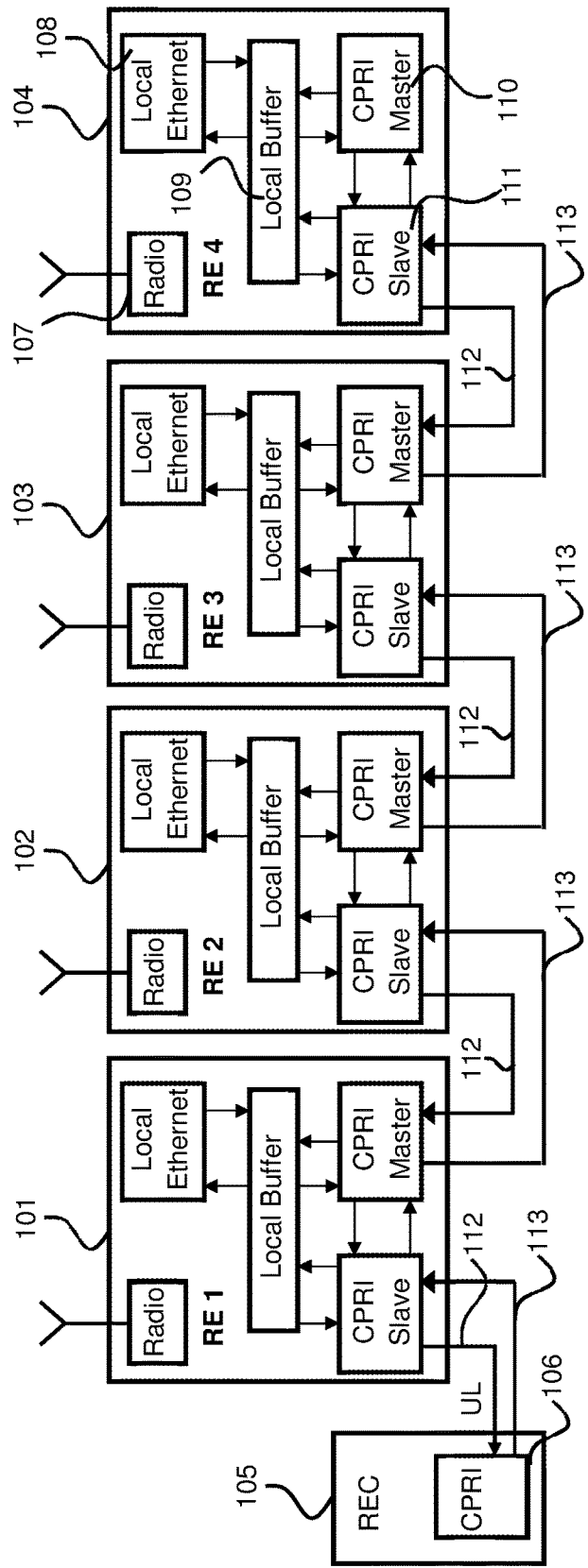
FIG. 1 is a simplified block diagram of radio equipment control and radio equipment modules configured in a chain network.

In order to support a CPRI daisy chain configuration, each RE/REC node may use a pair of CPRI modules connected through auxiliary interfaces. Both CPRI modules comprising the pair may be connected to a local system bus that allows the local processor to extract receive data from and to insert transmit data to the uplink and the downlink paths. Slow C&M channel (HDLC) data flow may be handled in this way. FIG. 1 shows an example where the dataflow of the slow C&M channel (HDLC) over a CPRI link is in a single REC and multiple RE configuration. In this example, four RE-s 101-104 are connected in a chain configuration and linked to an REC 105 which is provided with a CPRI unit 106. Each RE 101-104 comprises a radio 107, a local Ethernet 108, a local buffer 109 and a pair of CPRI modules 110, 111 configured in a master and slave arrangement and connected through auxiliary interfaces. An uplink data flow follows a path 112 from the RE104 most remote from the REC 105 through the other are RE-s 103, 102, 101 in the chain in sequence to the REC105. A downlink data flow follows a path 113 from the REC 105 through each RE in the chain in sequence.

An example embodiment of the present invention may be configured for managing HDLC data packets over the CPRI whereby each node is capable of supporting the following capabilities on both the uplink and downlink paths: firstly, the capability of extracting the received data packets intended for a local node and storing them in a local buffer memory for user application and at the same time, forwarding all received packets to the next node in the chain: secondly, the capability for inserting HDLC data packets which are generated by the local node into the HDLC dataflow without dropping and/or corrupting any data packets already in the chain: and thirdly, the capability for maintaining the HDLC packet flow over the CPRI link when the local processor goes through its soft reset sequence.

Figure 2:
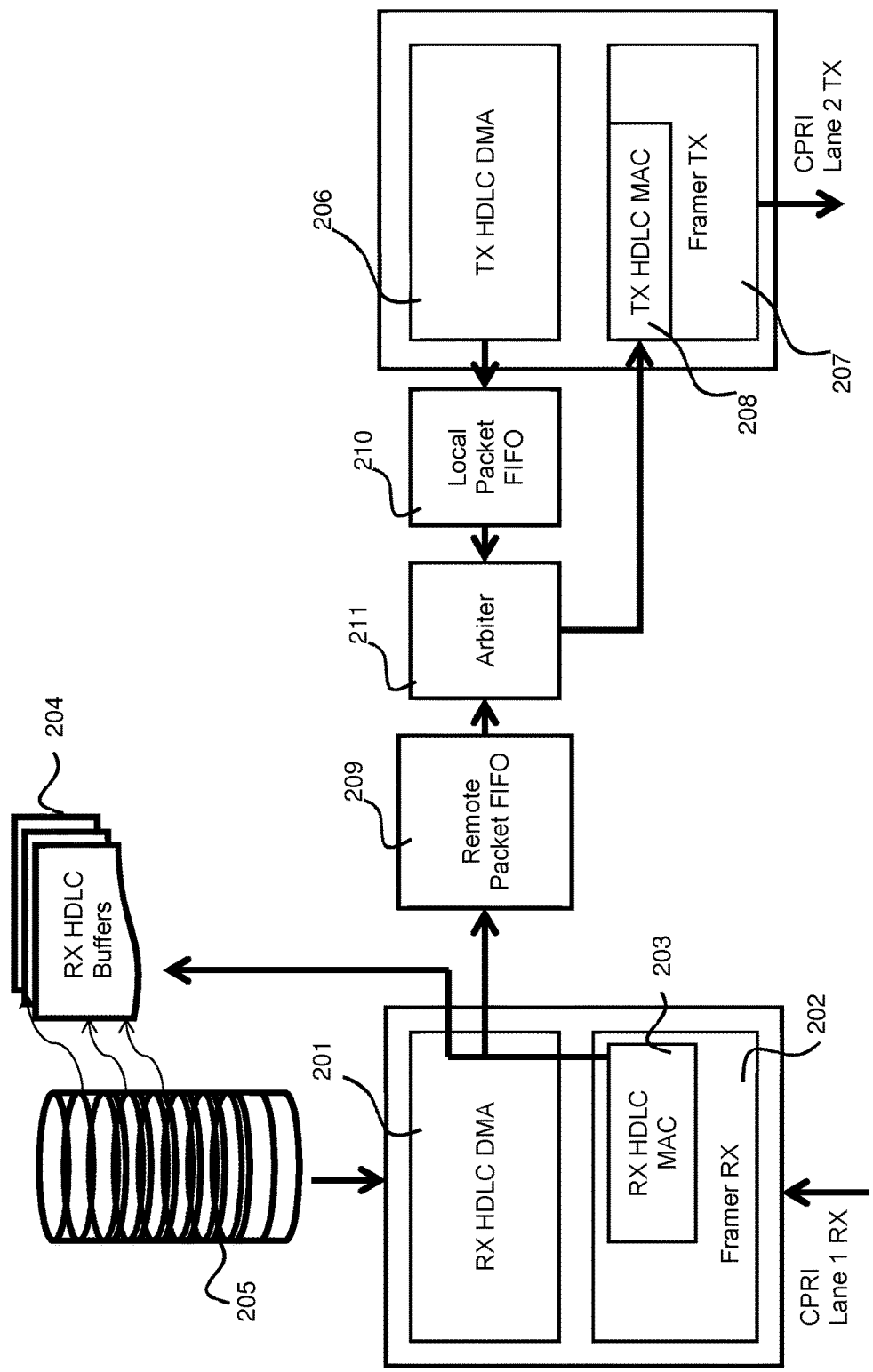
FIG. 2 is a simplified block diagram of an example of a system for controlling packet data flow.

Referring now to FIG. 2, a first (receive) CPRI Lane may comprise a receive HDLC direct memory access (DMA) module 201 and a receive framer 202 which includes a receive HDLC media access control (MAC) module 203. Receive HDLC buffers 204 which may form a part of a system memory and a receive HDLC buffer descriptor ring 205 are linked to the receive HDLC DMA module 201. A second (transmit) CPRI Lane may comprise a transmit HDLC direct memory access (DMA) module 206 and a transmit framer 207 which includes a transmit HDLC MAC module 208.

A remote packet buffer which may comprise a first FIFO (first-in-first-out) buffer 209 may be connected with the receive HDLC DMA module 201. A local packet buffer which may comprise a second FIFO 210 may be connected with the transmit HDLC DMA module 206. In this example, an arbiter 211 is connected between the first FIFO buffer 209 and the second FIFO buffer 210 and also operably coupled to the transmit HDLC MAC module 208.

The first FIFO 209 may hold incoming remote packets and may also hold sideband data (that is, remote packet size). The second FIFO 210 may hold locally-generated packets for delivery into an outgoing data stream. The second FIFO 210 may also hold sideband data, that is, local packet size.

Data packets generated by the local node and held in the second FIFO 210 may be inserted into the HDLC data flow and with a lower priority than the remote data packets held in the first FIFO 209. That is to say that there is an arbitration scheme between the remote and locally-generated packets. For example, when there are free slots in the HDLC channel data flow, the locally-generated data packets are inserted. In one example of operation, the priority for forwarding received (remote) packets (to the next node in the chain) is always higher than for forwarding local packets. The arbiter 211 selects packets according to the priority and forwards them to the transmit HDLC MAC module 208 which may then insert them into an outgoing datastream in accordance with known CPRI techniques. An empty or almost empty first FIFO 209, for example, may indicate to the arbiter 211 that there is an opportunity for forwarding local packets.

The receive HDLC MAC module 203 may be arranged to operate on each incoming HDLC packet by stripping the CRC (Cyclic Redundancy Check) in accordance with conventional procedures. All received (remote) data packets may be written into the receive HDLC buffers 204 for user application on receiving the relevant buffer descriptors from the buffer descriptor ring 205. The receive HDLC DMA module 201 may add tags of packet length to all received (remote\) packets and send the packets and the tags to the first FIFO buffer 209. Tags may also contain status information and CRC data that may be added by the receive framer 202.

The tags associated with packets give an indication of the size of packets stored the first FIFO 209. Thus, the first FIFO 209 may also be arranged so that it can provide an indication to the arbiter 211 if the remaining room in the FIFO is above a programmable threshold. The FIFO size may be predetermined and preset in order to ensure that no received packets are dropped or corrupted because of an overflow condition. The transmit framer 207 may commence to insert a local packet (or packets) into the HDLC channel data flow when the first FIFO 209 is empty or when the amount of data stored therein is below the pre-determined threshold. When this occurs, there will be a free slot in the HDLC channel data flow if no remote packets require forwarding to the next node. The first FIFO 209 may be prevented from overflowing with incoming data (while local data packets are being transferred from the arbiter 211 to the transmit framer 207), according to the maximum supported size of a local packet that can be inserted into the HDLC datastream. HDLC maximum transmission rate is known (depending on the CPRI link rate) and may be used to determine a first FIFO buffer size. In this way, local packets may be inserted without loss of any remote packets.

The exemplary method used for arbitrating remote and local packets may force all HDLC packets to go through a transmit HDLC MAC engine 208 instead of via any auxiliary interface which might be provided in the CPRI modules. This method has two advantages. Firstly, it eliminates the need to dynamically reconfigure the auxiliary interface mapping table. Secondly it eliminates any possibility of packet corruption or loss when inserting locally generated packets. This example embodiment keeps the feature of maintaining the CPRI daisychain configuration without any disruption to the HDLC channel flow when the local processor goes through any soft reset event. As the local processor enters the soft reset cycle, the local HDLC packets will not be presented to the arbiter 211. Hence the remote packets always win the arbitration and all received packets are forwarded to the transmitting CPRI framer without disruption.

Thus an apparatus for controlling packet dataflow may comprise a buffer 209 for holding received packets, a buffer 210 for holding locally-generated packets and an arbiter 211 for selecting received packets and local packets, according to a predetermined priority, for onward transmission.

Figure 3:
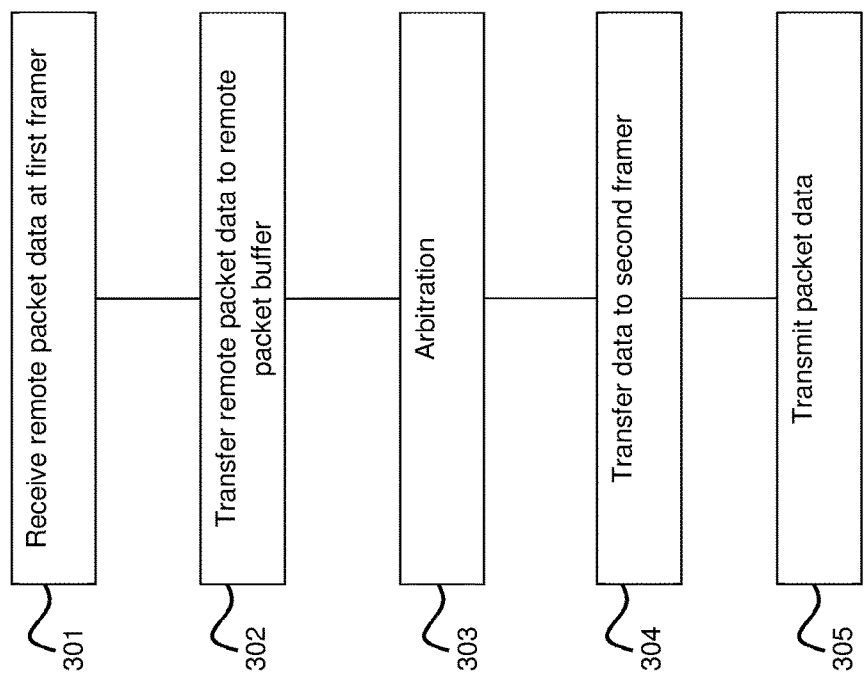
FIG. 3 is a simplified flowchart of an example of a method for controlling packet data flow.

An example of a method for controlling packet data flow will now be described with reference to the simplified flowchart of FIG. 3. At 301, remote packet data is received at a first framer. At 302, the received remote packet data is transferred to a remote packet buffer. An arbitration process occurs at 303 where priority is given to remote packets over local packets. At 304, selected packet data is transferred to a second framer and at 305 the packet data is transmitted onwards to another node in the communications chain.

Figure 4A:
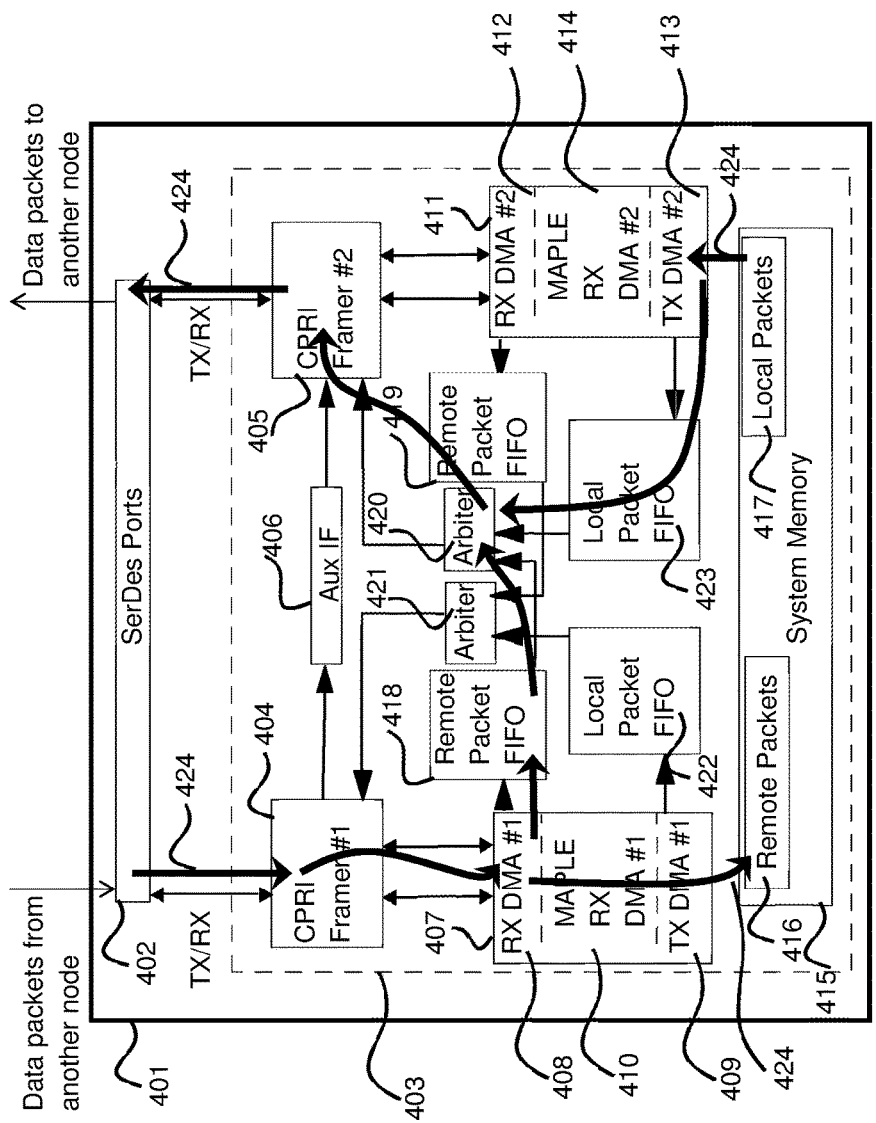
FIGS. 4A and 4B are simplified block diagrams of examples of systems for controlling packet data flow in an uplink direction and a downlink direction respectively.
Figure 4B:
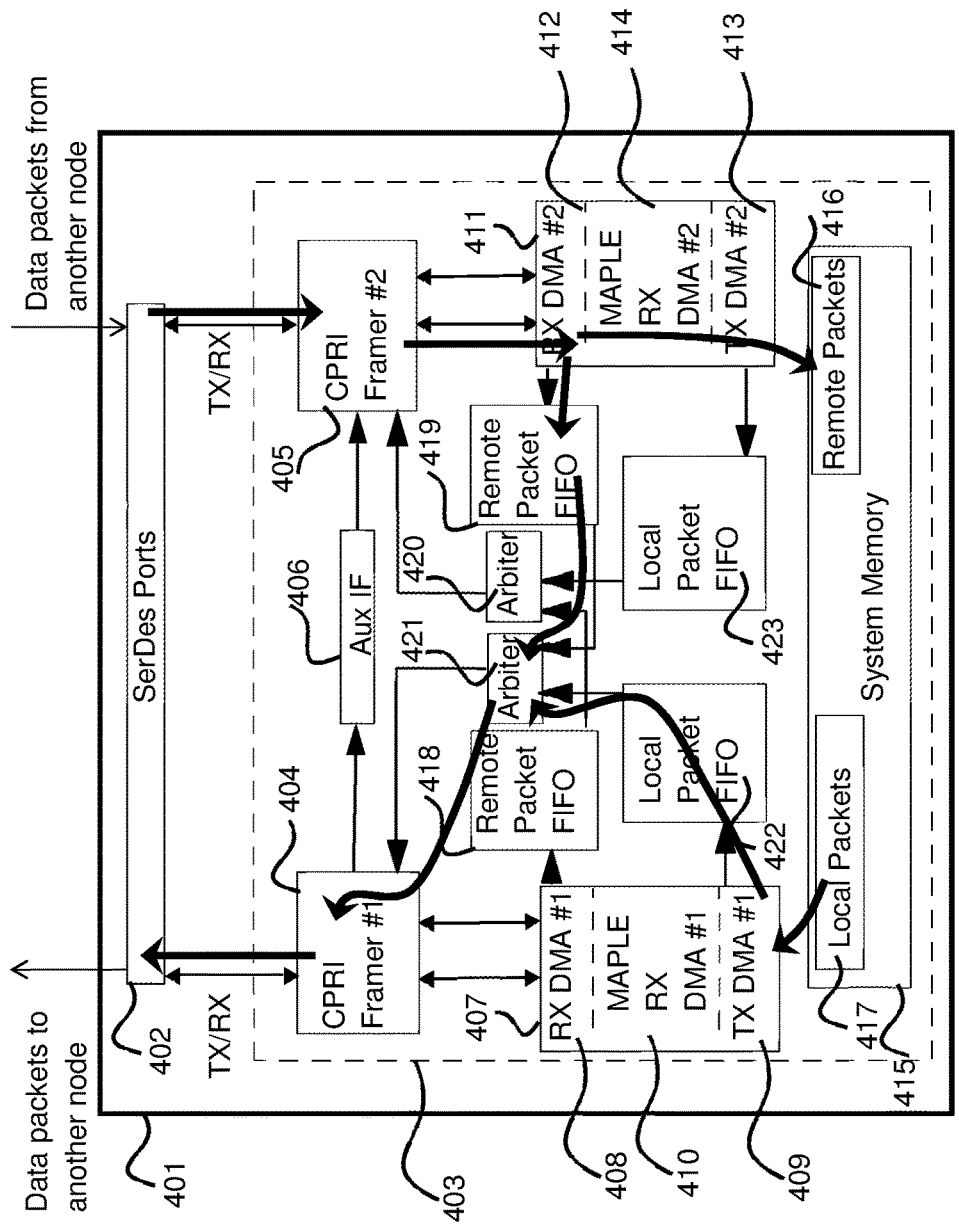

Reference will now be to FIGS. 4A and 4B, each of which illustrate an example of a communications node 401 which may be linked to other communication notes (not shown) in a chain configuration. The node 401 includes an example of apparatus suitable for controlling HDLC packet data flow. FIG. 4A illustrates an example of uplink HDLC packet data flow through the node 401. FIG. 4B illustrates an example of downlink HDLC packet data flow through the communication node 401.

With reference to both FIGS. 4A and 4B, in one embodiment, the node 401 includes a serialiser/deserialiser interface 402 which is connected with a CPRI module 403. The CPRI module 403 in this example includes a first framer 404 and a second framer 405 which may be interconnected by an auxiliary interface 406. The first framer 404 may be connected with a first processing block 407 which may contain a first receive direct memory access module (DMA) 408 and a first transmit direct memory access module 409. The second framer 405 may be connected with a second processing block 411 which may contain a second receive direct memory access module 412 and a second transmit direct memory access module 413. The first processing block 407 may further be provided with a third receive direct memory access module (DMA) 410 (for example, for transactions towards a multi-accelerator platform engine (MAPLE). The second processing block 411 may further be provided with a fourth direct memory access module (DMA) 414 (for example, for transactions towards a multi-accelerator platform engine MAPLE). Both the first processing block 407 and the second processing block 411 may be connected to a system memory 415. The system memory 415 may include a remote packet data store 416 and a local packet data store 417

The CPRI module 403 may also be provided with first and second received packet data buffers 418, 419 which may be FIFO buffers. In this example, the first received packet data buffer 418 is connected between the first remote receive DMA module 408 and a first arbiter 420. The second receive data packet buffer 419 is connected between the second receive DMA module 412 and a second arbiter 421. A first local packet data buffer 422 (which may be a FIFO buffer) is connected between the first transmit DMA module 409 and the second arbiter 421. A second local packet data buffer 423 (which may be a FIFO) is connected between the second transmit direct memory access module 413 and the first arbiter 420. An output of the first arbiter 420 is connected with the second framer 405. An output of the second arbiter 421 is connected with the first framer 404.

With reference to FIG. 4A, control of HDLC packet data flow 424 in the uplink direction will now be described. HDLC packet data is received from a remote node by the first framer 404 via the serialiser/deserialiser interface 402. The first framer 404 strips the CRC. The first receive direct memory access (DMA) module 408 adds tags for packet length and sends the tags and all received packets to the remote packet data store 416 in the system memory 415 and also to the first received packet data buffer 418. The second transmit DMA module 413 transfers tags and local packets from the local packet store 417 to the second local buffer 423. The first arbiter 420 arbitrates between remote and local packets in order to determine the order of packet transmission from the CPRI module 403. Remote packets always have higher priority. A remote received packet for transmission is sent from the first received packet data buffer 418 to the second framer 405 if it wins the arbitration. Otherwise, local HDLC packet data is sent from the second local buffer 423 to the second framer 405 via the first arbiter 420. The second framer 405 prepares the data packets for transmission in accordance with the CPRI standards and transfers them to the serialiser/deserialiser interface 402 where the data packets may be transmitted onwards to an upstream node.

With reference to FIG. 4B control of HDLC packet data flow 425 in the downlink direction will now be described. HDLC packet data is received from a remote node by the second framer 405 via the serialiser/deserialiser interface 402. The second framer 405 strips the CRC. The second receive direct memory access module 412 adds tags for packet length and sends the tags and all received packets to the remote packet data store 416 in the system memory 415 and also to the second received packet data buffer 419. The first transmit DMA module 409 transfers tags and local packets from the local packet store 417 to the first local packet data buffer 422. The second arbiter 421 arbitrates between remote and local packets in order to determine the order of packet transmission from the CPRI module 403. Remote packets always have higher priority. A remote received packet for transmission is sent from the second received packet data buffer 419 to the first framer 404 if it wins the arbitration. Otherwise, local HDLC packet data is sent from the first local buffer 422 to the first framer 404 via the second arbiter 421. The first framer 404 prepares the data packets for transmission in accordance with the CPRI standards and transfers them to the serialiser/deserialiser interface 402 where the data packets may be transmitted onwards to a downstream node.

The invention thus provides a method for extraction and insertion of HDLC packets over a CPRI link at the data link layer. Hence, local packets do not need to be processed through a MAC engine prior to entering the arbitration stage. Since remote and local packets may be sent through a transmit HDLC engine to arrive at an auxiliary multiplexer on the same path as one another, any auxiliary mapping table does not need to be dynamically updated when the CPRI module switches between transmitting remote and local packets. Further, the invention provides a hardware-based, priority-based HDLC packet parsing or framing insertion in a CPRI datalink layer. The connection is kept alive through soft reset flow.

The system and method as described with reference to the accompanying figures has the advantage of saving the need for an external HDLC switch. In addition the use of the system and method can minimise hardware design changes to existing CPRI modules. Further, the invention permits a networking node in a chain to seamlessly manage the HDLC channel of a CPRI link on both uplink and downlink paths.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for controlling packet data flow through a local transmission node in a chain of transmission notes the method including; receiving at a first framer, remote packet data from a remote node in the chain, transferring received remote packet data to a remote packet data buffer, arbitrating between packet data held in the remote packet data buffer and local packet data, transferring remote packet data and local packet data to a second framer with remote packet data having priority, and transmitting packet data from the second framer to a subsequent communication node.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media: nonvolatile memory storage media including semiconductor-based memory units such as FLASH memory, EEPROM, EPROM, ROM; ferromagnetic digital memories; MRAM; volatile storage media including registers, buffers or caches, main memory. RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. For example, the arbitration scheme described above may be varied to allow different priorities to local and remote packets. The invention also has application to the Ethernet protocol or L1 inband transmissions. In the case of Ethernet, buffer descriptors may be used instead of local packet data FIFO buffers (because of the higher rate of Ethernet)

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example the entire functionality of the CPRI module 403 of FIGS. 4A and 4B may be implemented in one integrated circuit. Alternatively, the FIFO buffers 209, 210 and arbiter 211 of FIG. 2 may be implemented as circuitry located on a single integrated circuit or within a same device. That is to say that apparatus for controlling packet data flow may be implemented in an integrated circuit. Alternatively, the examples may be implemented as any number of separate integrated circuits or separate devices interconnected with each other in a suitable manner. For example, the arbiters, remote packet FIFO's and local packet FIFO's may be implemented in a single integrated circuit device of FIG. 4A or 4B. An integrated circuit device may comprise one or more dies in a single package with electronic components provided on the dies that form the modules and which are connectable to other components outside the package through suitable connections such as pins of the package and bondwires between the pins and the dies.

Also for example, the embodiments, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for controlling packet data flow through a local transmission node in a chain of Common Public Radio Interface (CPRI) transmission nodes, the method comprising:
   receiving, at a first framer of a first CPRI transmission node, remote packet data from a second CPRI transmission node in the chain;
   transferring the remote packet data to a remote packet data buffer of the first CPRI transmission node and to a remote packet data store in a system memory;
   arbitrating, by an arbiter of the first CPRI transmission node, between the remote packet data held in the remote packet data buffer and local packet data from a local packet data store in the system memory;
   transferring, by the arbiter, the remote packet data and the local packet data to a second framer of the first CPRI transmission node with the remote packet data having priority;
   transmitting, by the second framer, the remote packet data and the local packet data to a third CPRI transmission node;
   receiving, at the second framer of the first CPRI transmission node, second remote packet data from the third CPRI transmission node in the chain;
   transferring the second remote packet data to a second remote packet data buffer of the first CPRI transmission node and to the remote packet data store in the system memory;
   transferring second local packet data from the local packet data store in the system memory to a second local packet data buffer of the first CPRI transmission node;
   arbitrating, by a second arbiter of the first CPRI transmission node, between the second remote packet data held in the second remote packet data buffer and the second local packet data in the second local packet data buffer;
   transferring, by the arbiter, the second remote packet data and the second local packet data to the second framer of the first CPRI transmission node with the second remote packet data having priority; and
   transmitting, by the second framer, the second remote packet data and the second local packet data to the second CPRI transmission node.

2. The method of claim 1 wherein the remote and local packet data is control and management data carried on a High-Level Datalink Control (HDLC) channel.

3. The method of claim 1 wherein the local packet data is transferred to the second framer when there is a free slot in the remote packet data flow.

4. The method of claim 1 wherein tags of packet length are added to the remote packet data and said tags are sent to the remote packet data buffer.

5. The method of claim 1 further comprising:
receiving at a direct memory access (DMA) processor of the first CPRI transmission node, the local packet data; and
transferring the local packet data to a local packet data buffer, wherein, in arbitrating between the remote packet data held and the local packet data, the local packet data is held in the local packet data buffer.

6. The method of claim 1, wherein in transmitting the remote packet data and the local packet data, the method further comprises:
bypassing an auxiliary interface between the first framer and the second framer.

7. An apparatus for controlling packet data flow through a local transmission node in a chain of Common Public Radio Interface (CPRI) transmission nodes, the apparatus comprising:
a first remote packet data buffer to store remote packet data received from a first CPRI node in the chain;
a system memory including a remote packet store and a local packet store;
a first local packet data buffer to store local packet data;
an arbiter to select between local packet data in the first local packet data buffer from the first local packet store and the remote packet data from the first remote packet data buffer according to a predetermined order of priority, and to transfer the remote packet data and the local packet data from the first local packet store for onward transmission to a second CPRI transmission node in the chain of nodes in accordance with the selection;
a first framer;
a second framer;
a second remote packet data buffer;
a second local packet data buffer;
the first framer configured to transfer second remote packet data to the second remote packet data buffer and to the remote packet data store in the system memory;
a second arbiter configured to
receive the second remote packet data held in the second remote packet data buffer and second local packet data in the second local packet data buffer; and
transfer the second remote packet data and the second local packet data to the second framer with the second remote packet data always having priority.

8. The apparatus of claim 7 wherein the remote and local packet data is control and management data carried on a High-Level Datalink Control (HDLC) channel.

9. The apparatus of claim 7 wherein the local packet data is transferred to the second framer when there is a free slot in the remote packet data flow.

10. The apparatus of claim 7 wherein tags of packet length are added to the remote packet data and said tags are sent to the remote packet data buffer.

11. The apparatus of claim 7, wherein the remote packet data is transferred to the remote packet store in the system memory.

12. A system for controlling packet data flow through a local transmission node in a chain of Common Public Radio Interface (CPRI) transmission nodes, the system comprising:
a first framer to receive remote packet data from a first CPRI transmission node in the chain;
a system memory including a remote packet store to store the remote packet data and a local packet store to store local packet data;
a remote packet data buffer to store the remote packet data;
a local packet data buffer to store the local packet data;
an arbiter to select between the local packet data in the local packet data buffer that is from the local packet store and the remote packet data in the remote packet data buffer in a predetermined order of priority;
a second framer to transmit packet data selected by the arbiter to a second CPRI transmission node in the chain;
a second remote packet data buffer;
a second local packet data buffer;
the first framer configured to transfer second remote packet data to the second remote packet data buffer and to the remote packet store in the system memory;
a second arbiter configured to receive the second remote packet data held in the second remote packet data buffer and second local packet data in the second local packet data buffer; and
transfer the second remote packet data and the second local packet data to the second framer with the second remote packet data always having priority.

13. The system of claim 12 wherein the remote and local packet data is control and management data carried on a High-Level Datalink Control (HDLC) channel.

14. The system of claim 12 wherein the arbiter is further to transfer the local packet data to the second framer when an amount of data contained in the remote packet data buffer is below a threshold value.

15. The system of claim 12 wherein the remote packet data buffer has a size depending on a maximum size of a local packet to be transmitted.

16. The system of claim 12 further comprising:
a direct memory access module to add tags of packet length to the remote packet data and to send said tags and said remote packet data to the remote packet data buffer.

17. The system of claim 16, wherein the direct memory access module is further to write the remote packet data into the remote packet store.

* * * * *